(12) United States Patent
Fechler et al.

(10) Patent No.: US 11,909,021 B2
(45) Date of Patent: Feb. 20, 2024

(54) HIGH-VOLTAGE BATTERY, METHOD FOR PRODUCING SAME AND MOTOR VEHICLE HAVING A BATTERY OF THIS TYPE

(71) Applicant: Dr. Ing. h.c. F. Porsche Aktiengesellschaft, Stuttgart (DE)

(72) Inventors: Sonja Fechler, Affalterbach (DE); Fadi Renz, Kornwestheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 168 days.

(21) Appl. No.: 17/406,295

(22) Filed: Aug. 19, 2021

(65) Prior Publication Data

US 2022/0059884 A1 Feb. 24, 2022

(30) Foreign Application Priority Data

Aug. 20, 2020 (DE) .................. 10 2020 121 882.6

(51) Int. Cl.
*H01M 10/6556* (2014.01)
*H01M 10/613* (2014.01)
*H01M 10/625* (2014.01)
*H01M 10/6568* (2014.01)

(52) U.S. Cl.
CPC ..... *H01M 10/6556* (2015.04); *H01M 10/613* (2015.04); *H01M 10/625* (2015.04); *H01M 10/6568* (2015.04); *H01M 2220/20* (2013.01)

(58) Field of Classification Search
CPC ............ H01M 10/613; H01M 10/625; H01M 10/6556; H01M 10/6568; H10M 2220/20
See application file for complete search history.

(56) References Cited

U.S. PATENT DOCUMENTS

| | | | |
|---|---|---|---|
| 10,270,140 | B2 | 4/2019 | Koller |
| 2012/0164490 | A1* | 6/2012 | Itoi ..................... H01M 50/358 429/82 |
| 2013/0004822 | A1 | 1/2013 | Hashimoto et al. |
| 2015/0030902 | A1* | 1/2015 | Nagano ............... H01M 10/615 429/120 |
| 2017/0200990 | A1* | 7/2017 | Hsu ..................... H01M 10/613 |
| 2019/0081287 | A1* | 3/2019 | Doyle ................. H01M 50/317 |
| 2019/0283627 | A1* | 9/2019 | Gehringhoff ....... H01M 10/613 |
| 2019/0341593 | A1* | 11/2019 | Thurmeier .......... H01M 10/613 |
| 2020/0006826 | A1* | 1/2020 | Einoegg ........... H01M 10/6567 |
| 2020/0022278 | A1* | 1/2020 | Pradeepkumar ..... H05K 7/1474 |

(Continued)

FOREIGN PATENT DOCUMENTS

DE 102014203943 A1 9/2015
DE 102014217931 A1 3/2016
(Continued)

OTHER PUBLICATIONS

Japanese Notice of Reasons for Refusal for Japanese Application No. 2021-131935, dated Jul. 27, 2022, with translation, 10 pages.

(Continued)

*Primary Examiner* — Scott J. Chmielecki
(74) *Attorney, Agent, or Firm* — RatnerPrestia

(57) ABSTRACT

A high-voltage battery for a motor vehicle has a coolant connection of multipartite design. Also described is a corresponding method for producing the high-voltage battery, and a motor vehicle having a battery of this type.

11 Claims, 4 Drawing Sheets

(56) References Cited

U.S. PATENT DOCUMENTS

| | | | |
|---|---|---|---|
| 2020/0091573 A1 | 3/2020 | Einoegg et al. | |
| 2020/0112007 A1* | 4/2020 | Kwag | H01M 50/213 |
| 2020/0136175 A1* | 4/2020 | Qiu | H01M 10/0477 |
| 2020/0136215 A1* | 4/2020 | Qiu | H01M 10/6556 |
| 2020/0161728 A1* | 5/2020 | Wang | H01M 10/6554 |
| 2020/0313130 A1* | 10/2020 | Eulitz | H01M 10/6556 |
| 2020/0350646 A1* | 11/2020 | Weinmann | H01M 10/6568 |
| 2021/0098841 A1* | 4/2021 | Masaryk | H01M 50/262 |
| 2021/0391612 A1 | 12/2021 | Um et al. | |

FOREIGN PATENT DOCUMENTS

| | | |
|---|---|---|
| DE | 102017208617 A1 | 11/2018 |
| DE | 102017006517 A1 | 1/2019 |
| EP | 2337141 A1 | 6/2011 |
| EP | 2830123 A2 | 1/2015 |
| EP | 2985560 A1 | 2/2016 |
| EP | 3223338 A1 | 9/2017 |
| EP | 3667759 A1 | 6/2020 |
| JP | 2015020685 A | 2/2015 |
| JP | 3198941 U | 7/2015 |
| JP | 2017174792 A | 9/2017 |
| WO | 2020101354 A1 | 5/2020 |

OTHER PUBLICATIONS

Great Britain Combined Search and Examination Report for Application No. GB2111832.8, dated Apr. 8, 2022, 5 pages.
Sicherungsring In: Wikipedia, Die freie Enzyklopädie. Bearbeitungsstand: May 10, 2020, 12:01 UTC. URL: https://de.wikipedia.org/wiki/Sicherungsring [Downloaded Apr. 21, 2021], with English translation, 6 pages.

* cited by examiner

HIGH-VOLTAGE BATTERY, METHOD FOR PRODUCING SAME AND MOTOR VEHICLE HAVING A BATTERY OF THIS TYPE

CROSS-REFERENCE TO RELATED APPLICATION

This application claims priority to German Patent Application No.: 10 2020 121 882.6, filed Aug. 20, 2020, the content of such application being incorporated by reference herein in its entirety.

FIELD OF THE INVENTION

The present invention relates to a high-voltage battery for a motor vehicle. The present invention furthermore relates to a corresponding method for producing a high-voltage battery, and to a motor vehicle having a battery of this type.

BACKGROUND OF THE INVENTION

DE 102017208617 A1 and EP 3667759 A1, which are each incorporated by reference herein, each disclose a cooling line, the inner part of which forms a flexible tube for compensating for tolerances.

DE 102017006517 A1, which is incorporated by reference herein, relates to a cooling connection, fastened in a releasable manner via an adapter, on the housing cover of a battery. For this purpose, the battery cover has a cylindrical opening, into which a fluid-guiding connection plug is plugged.

In a different connection, DE 102014203943 A1, which is incorporated by reference herein, proposes a screwed connection flange.

SUMMARY OF THE INVENTION

Described herein is a high-voltage battery for a motor vehicle, a corresponding method for producing a high-voltage battery and a motor vehicle having a battery of this type.

An advantage of this battery is its coolant connection, which does not hinder the assembly and, in particular, the welding of the battery cover.

The high-voltage battery can thus contain a coolant line that is flexible at least in sections for the purpose of tolerance compensation.

The coolant connection can also comprise a flat seal for ensuring the seal tightness.

Finally, the coolant connection can comprise a connection flange with threaded sleeves that are accessible from outside of the high-voltage battery and that likewise contribute to ensuring the seal tightness and fixing the coolant connection.

BRIEF DESCRIPTION OF THE DRAWING FIGURES

One exemplary embodiment of the invention is illustrated in the drawings and will be described in more detail below.

DETAILED DESCRIPTION OF THE INVENTION

Figure 1:
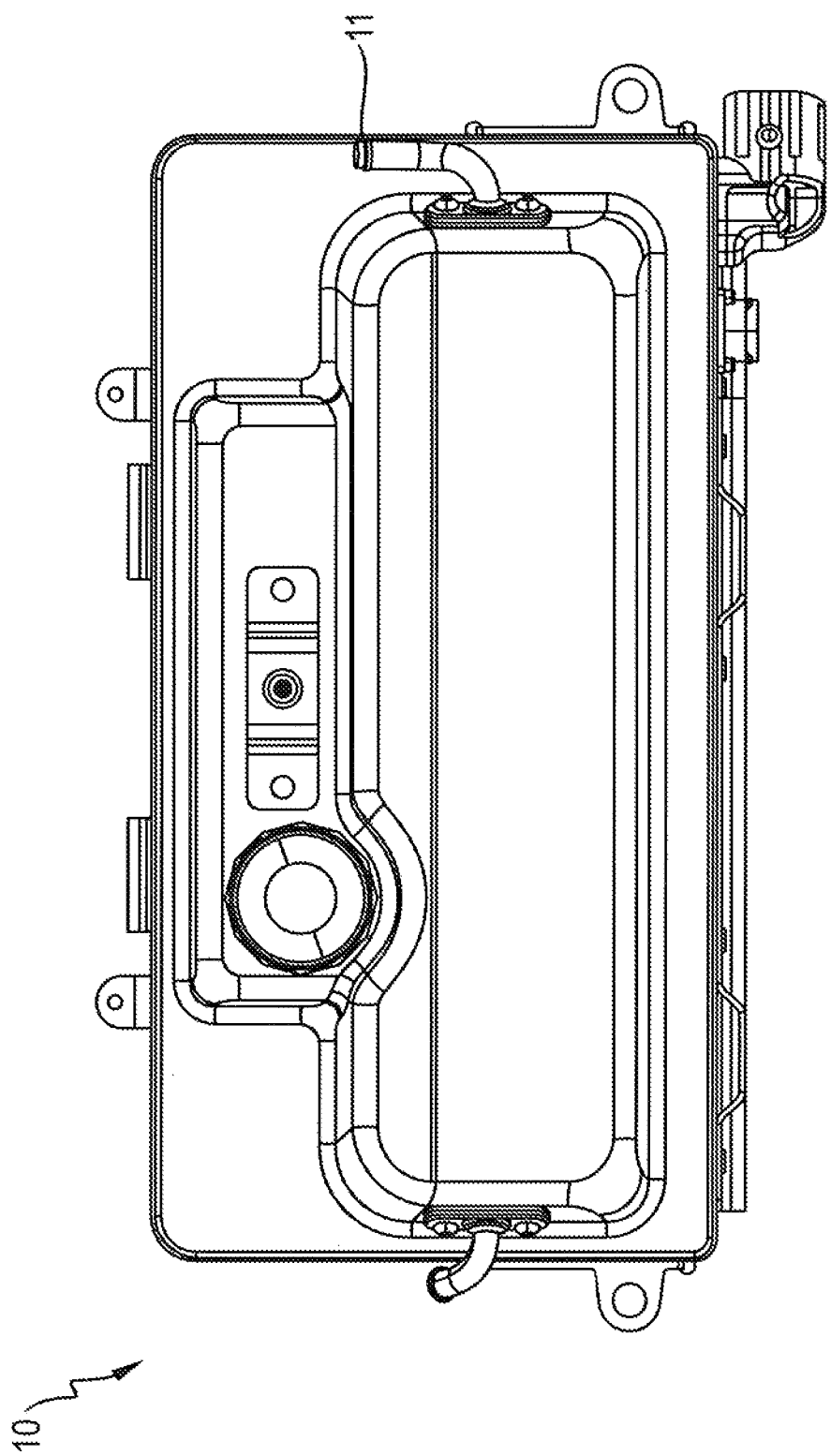
FIG. 1 shows the top view of a high-voltage battery.

FIG. 1 illustrates a problem that sometimes arises when the cover of a cooled high-voltage battery (10) is assembled: As soon as the coolant connection (11) is produced, it hinders the welding of the cover on the high-voltage battery (10).

Figure 2:
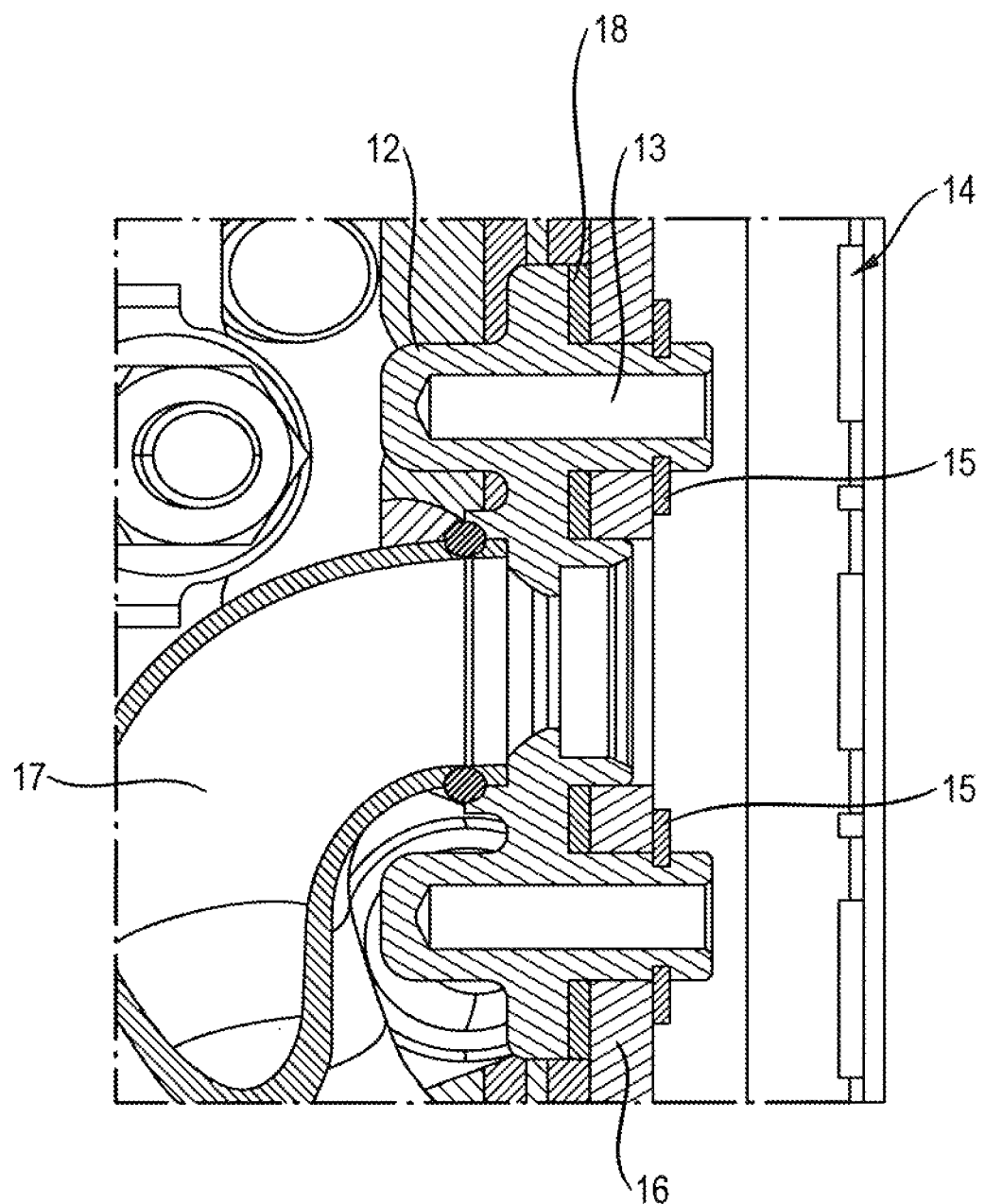
FIG. 2 shows a module of the high-voltage battery.

FIG. 2 illustrates a possible solution for the outlined problem, according to which the coolant connection (11—FIG. 1) is of two-part design. The term multipartite used herein can mean more than one part. In this case, a first part forms a connection flange (12) for a coolant line (17), said connection flange being arranged predominantly inside the high-voltage battery (10) and thus, according to the FIG., on the left of the cover wall (16) thereof.

Said inner part of the coolant connection (11—FIG. 1) is accessible from outside of the high-voltage battery (10) by two threaded sleeves (13) with axially parallel blind holes, which, equidistantly from the coolant line (17), project toward the outside through the cover wall (16). Each of said threaded sleeves (13) is grooved circumferentially and carries in its groove a securing ring (15), which supports the coolant connection (11) from outside against the cover wall (16) in this way. The position of the groove longitudinally with respect to the respective threaded sleeve (13) thus defines the spacing of the mouth thereof from the cover wall (16).

The coolant line (17)—at least in the section thereof facing the coolant connection (11)—is welded on the inner side of the cover wall (16) to the connection flange (12) and is of flexible design in order to be able to compensate for any tolerances of the components of the high-voltage battery (10). A flat seal (18) is also inserted between the connection flange (12) and the cover wall (16) and seals the high-voltage battery (10) from the surroundings thereof.

Figure 3:
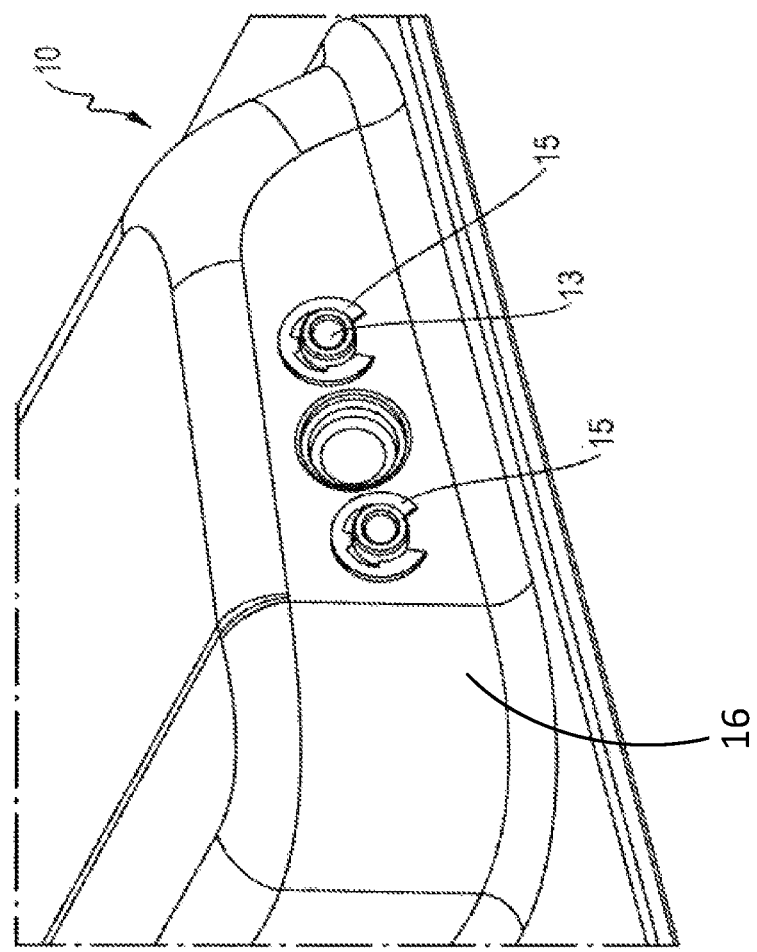
FIG. 3 shows the cooling connection fixing after the welding.

These structural characteristics make it possible for the connection flange (12) to be placed against the cover wall (16) from inside—before or after the coolant line (17) has been welded—in an intuitive manner in such a way that the threaded sleeves (13) project toward the outside through the cover wall (16) and for the securing rings (15) to be able to be slid onto the threaded sleeves (13) from the outside until they engage into the grooves thereof. In this state, the cover wall (16) can be provided with a circumferential weld seam (14) in an unhindered manner in order to seal off the high-voltage battery (10). FIG. 3 illustrates the cooling connection fixing after this weld seam (14) has been applied.

Figure 4:
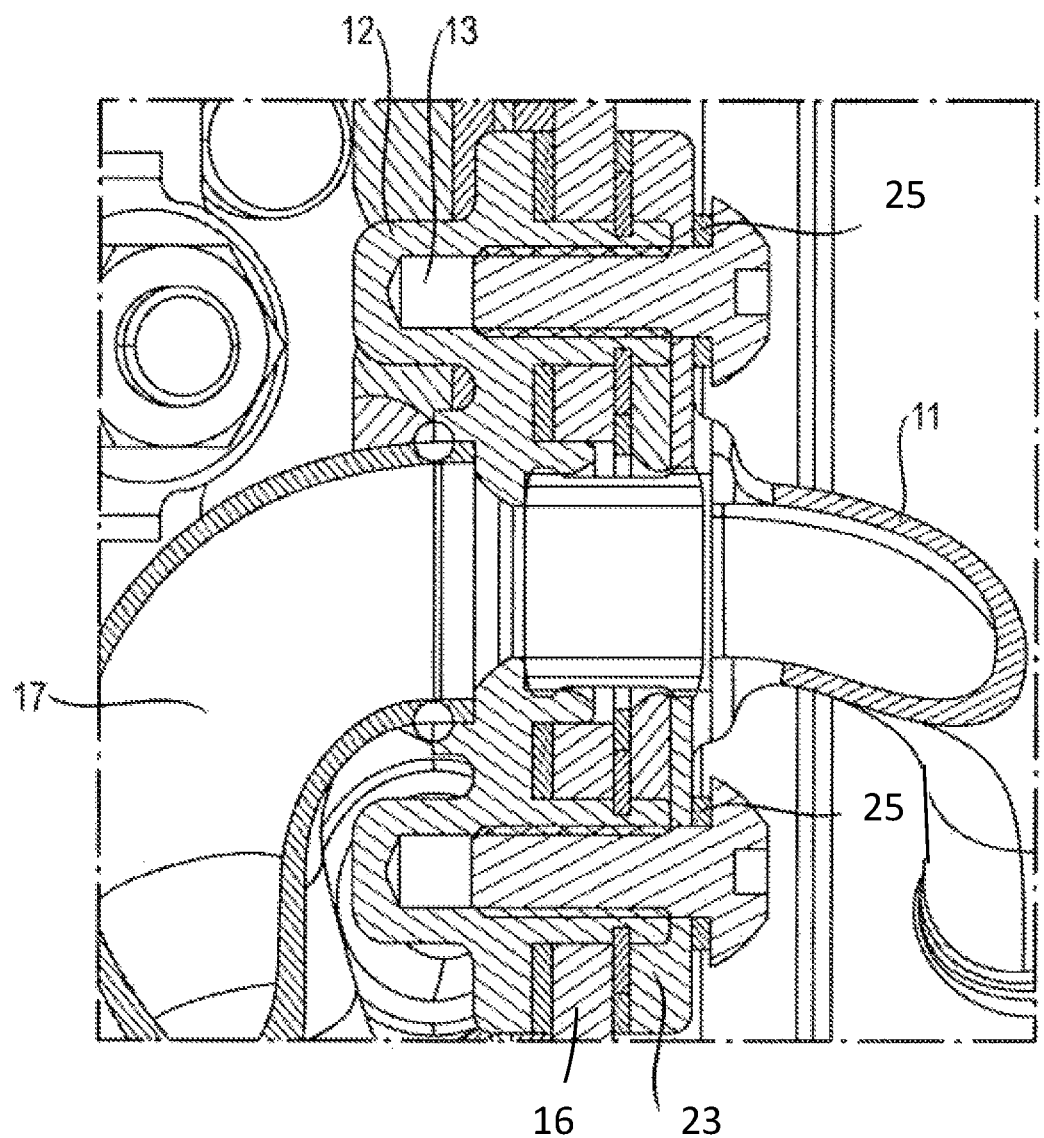
FIG. 4 shows the final assembly of the cooling connection.

Only in the context of a final assembly according to FIG. 4 is the coolant connection (11) finally screwed from the outside to a cover (23) by means of the threaded sleeves (13) by virtue of two screws having washer rings (25) being inserted into the blind holes and being screwed with a torque of 10 Nm. The high-voltage battery (10) assembled in such a way may serve, for example, as a mobile electrical energy storage in the form of a traction or drive battery for driving an electric vehicle.

What is claimed:

1. A high-voltage battery for a motor vehicle, said high-voltage battery comprising:
a battery housing defining an interior space that is at least partially concealed by a cover, said cover having a cover wall including an interior facing surface, an exterior facing surface opposite the interior facing surface, a first aperture formed through the cover wall, and a second aperture formed through the cover wall that is spaced apart from the first aperture;

a coolant connection of multipartite design, said coolant connection including a connection flange mounted to the cover wall, said connection flange comprising a body having (i) a first opening that registers and is aligned with the first aperture and (ii) a threaded sleeve that is positioned through the second aperture, said threaded sleeve including a flange that is positioned within the interior space to face the interior facing surface of the cover wall and an elongated portion that extends through the second aperture beyond the exterior facing surface to a location outside of the interior space, said coolant connection further including a securing ring that is positioned outside of the interior space and connected to the elongated portion for securing the connection flange to the cover wall; and a coolant line that is positioned within the interior space of the battery housing and connected to the first opening of the connection flange.

2. The high-voltage battery as claimed in claim 1, wherein the connection flange has a plurality of the threaded sleeves that are accessible from a location outside of the high-voltage battery, and a plurality of the securing rings that are respectively mounted to the threaded sleeves.

3. The high-voltage battery as claimed in claim 2, wherein the threaded sleeves have circumferential grooves and the securing rings respectively engage in the circumferential grooves.

4. The high-voltage battery as claimed in claim 1, wherein the coolant line is flexible at least in sections and the coolant line is connected to the coolant connection via the first opening in the connection flange.

5. The high-voltage battery as claimed in claim 1, wherein the coolant connection also comprises a flat seal for sealing the high-voltage battery and the flat seal is arranged between the flange of the threaded sleeve and the interior facing surface of the cover wall.

6. The high-voltage battery as claimed in claim 1, further comprising: a weld seam surrounding the cover wall that seals the high-voltage battery, and the coolant connection being fastened to the cover wall from the outside by way of the threaded sleeve.

7. The high-voltage battery as claimed in claim 1, wherein the coolant connection is fastened to the cover wall by at least one screw that is fastened to the threaded sleeve.

8. A motor vehicle having a high-voltage battery as claimed in claim 1.

9. The high-voltage battery as claimed in claim 1 further comprising another cover that is mounted to the cover wall and is positioned to bear on the securing ring and the threaded sleeve, said another cover having (i) a first hole that is aligned with the first aperture and the first opening and (ii) a second hole that is aligned with the threaded sleeve and the second aperture.

10. The high-voltage battery as claimed in claim 9 further comprising a screw that is positioned through the second hole and is threadedly mounted to the threaded sleeve.

11. The high-voltage battery as claimed in claim 1, wherein the flange of the threaded sleeve includes an axially extending portion that is positioned at least partially through the first aperture of the cover wall.

* * * * *